US008477395B2

(12) United States Patent
Newman et al.

(10) Patent No.: US 8,477,395 B2
(45) Date of Patent: Jul. 2, 2013

(54) COMPUTATION OF GAMUT BOUNDARY BY SAMPLING DEVICE-INDEPENDENT COLOR SPACE

(75) Inventors: Todd D. Newman, Palo Alto, CA (US); John S. Haikin, Fremont, CA (US)

(73) Assignees: Canon Kabushiki Kaisha, Tokyo (JP); Microsoft Corporation, Redmond, WA (US)

( * ) Notice: Subject to any disclaimer, the term of this patent is extended or adjusted under 35 U.S.C. 154(b) by 1361 days.

(21) Appl. No.: 11/245,655

(22) Filed: Oct. 7, 2005

(65) Prior Publication Data

US 2007/0081176 A1   Apr. 12, 2007

(51) Int. Cl.
*G03F 3/08* (2006.01)

(52) U.S. Cl.
USPC ........... 358/518; 345/590; 358/1.13; 358/1.9; 358/500; 382/162; 382/167

(58) Field of Classification Search
USPC ............ 345/590, 593, 600; 347/43; 358/1.12, 358/1.13, 1.9, 500, 518, 520; 382/162, 167
See application file for complete search history.

(56) References Cited

U.S. PATENT DOCUMENTS

| | | | | |
|---|---|---|---|---|
| 5,664,072 A * | 9/1997 | Ueda et al. | ...................... | 358/1.9 |
| 5,704,026 A * | 12/1997 | Wan | .............. | 345/590 |
| 5,731,818 A * | 3/1998 | Wan et al. | ...................... | 345/590 |
| 5,740,076 A * | 4/1998 | Lindbloom | ................... | 345/590 |
| 5,832,109 A * | 11/1998 | Mahy | .............. | 382/162 |
| 6,377,355 B1 * | 4/2002 | Kumada | ...................... | 358/1.12 |
| 6,480,301 B1 * | 11/2002 | Cholewo | ........................ | 358/1.9 |
| 6,778,185 B1 | 8/2004 | Moroney | ....................... | 345/590 |
| 6,850,342 B2 | 2/2005 | Woolfe et al. | .................. | 358/1.9 |
| 2002/0145744 A1 * | 10/2002 | Kumada et al. | ................. | 358/1.9 |
| 2003/0117457 A1 | 6/2003 | Qiao | ............................... | 347/43 |
| 2003/0234943 A1 * | 12/2003 | Van Bael | ....................... | 358/1.9 |
| 2004/0096104 A1 * | 5/2004 | Terekhov | ....................... | 382/167 |
| 2005/0047648 A1 | 3/2005 | Newman et al. | .............. | 382/162 |
| 2005/0047654 A1 | 3/2005 | Newman et al. | .............. | 382/167 |

OTHER PUBLICATIONS

The ICC Specification ICC.1:2001-04 (International Color Consortium, © 1994-2001), selected pages.*
Yilmaz, et al.; "Color Calibration of Scanners Using Polynomial Transformation", Commission V, WG V/1. XXth ISPRS Congress: Proceedings of Commission V, Istanbul, Turkey, p. 890-895 (2004).

* cited by examiner

*Primary Examiner* — King Poon
*Assistant Examiner* — David S Cammack
(74) *Attorney, Agent, or Firm* — Fitzpatrick, Cella, Harper & Scinto

(57) ABSTRACT

The present invention provides for determining a gamut boundary description for a color device, the color device being characterized at least by a destination transform which converts colors from a device-independent color space to a device-dependent color space and which reports out-of-gamut colors. A set of sample values is determined in the device-independent color space. For each of the sample values within the set of sample values, the destination transform is applied to the sample value, and in a case where the sample value is in gamut, the sample value is included within a set of gamut boundary values. The gamut boundary description is determined by forming a set of polygonal surfaces based on the set of gamut boundary values. Accordingly, a gamut boundary description is determined without necessarily having to sample additional color values as the number of colorant channels for the color device increases.

7 Claims, 6 Drawing Sheets

COMPUTATION OF GAMUT BOUNDARY BY SAMPLING DEVICE-INDEPENDENT COLOR SPACE

BACKGROUND OF THE INVENTION

1. Field of the Invention

The invention relates to the field of gamut boundaries for color devices, and more particularly relates to the computation of a gamut boundary description for a color device.

2. Description of the Related Art

Gamut mapping is used to reproduce an image rendered by an input device on an output device, since the input device and the output device typically have different gamut boundaries with respect to each other. In other words, the gamut of colors that can be reproduced by the input device is typically not the same as the gamut of colors that can be reproduced by the output device. Gamut mapping can be used to render the image from within the input device gamut boundary to within the output device gamut boundary, so as to more accurately reproduce the color image on the output device.

Gamut mapping of image data from one gamut to another is typically performed using a gamut mapping algorithm, which is a particular method of mapping color data between gamuts. A gamut mapping algorithm often makes use of data that defines the boundaries of the color gamut of the input and the output devices, in order to obtain a reference between the two gamuts for appropriate gamut mapping of the image. Such data defining the gamut color boundary can be referred to as a gamut boundary description.

In measurement-based color management systems, the gamut boundary description is typically computed at run time. It is therefore preferred that the gamut boundary description be computed quickly and without significant impact on system resources, such as memory.

One convenient representation of a gamut boundary is as a set of convex, planar polygons. A well-known method to obtain such a set of bounding polygons is by computing the convex hull of device-independent colors associated with a set of color samples for the device. Although there are other ways to determine the bounding set of polygons given a set of sample values within the gamut volume, the convex hull is the preferred representation. When a measurement-based color management system uses a measurement-based color profile, an adequate set of sample values is typically provided by the color profile. However, when the measurement-based color management system uses a transform-based color profile (e.g., ICC profile), sample values in device-independent color space are not provided, and must therefore be separately computed.

One approach for obtaining the sample values used to compute the gamut boundary description is to select a set of sample values in the device-dependent color space of the device, and to convert the selected values to device-independent color space using a source transform, which converts colors from device-dependent color space to device-independent color space. The gamut boundary description can then be determined by taking a convex hull of the resulting device-independent color values.

Using this technique, the device-dependent color space is typically sampled from minimum to maximum in each of the different device colorant channels at a set interval. For example, given an RGB device, samples for each of R, G, and B can be taken from 0 to 255 in steps of 15, giving 17 separate steps in each of three dimensions. This calculates to $17^3$, or 4913 samples.

However, the number of selected samples increases as the number of colorant channels increases. In a 6-channel device, for example, the number of samples increases to $17^6$, or over 24 million samples. Since the step size (e.g., 17 steps per channel) is a decent control over the accuracy of the resulting gamut boundary, the foregoing technique requires substantially more computation time and resources when dealing with color devices with more than 3 channels.

SUMMARY OF THE INVENTION

In view of the foregoing problems, the present invention provides for the determination of a gamut boundary description for a color device, without necessarily having to sample additional color values as the number of colorant channels increases. A set of sample values in a device-independent color space is determined, and those sample values which are within the gamut of the color device are included within a set of gamut boundary values. A set of polygonal surfaces are formed based on the set of gamut boundary values to determine the gamut boundary description.

According to one aspect of the invention, a gamut boundary description for a color device is determined, the color device being characterized at least by a destination transform which converts colors from a device-independent color space to a device-dependent color space and which reports out-of-gamut colors. A set of sample values is determined in the device-independent color space. For each of the sample values within the set of sample values, the destination transform is applied to the sample value, and in a case where the sample value is in gamut, the sample value is included within a set of gamut boundary values. The gamut boundary description is determined by forming a set of polygonal surfaces based on the set of gamut boundary values.

The set of sample values can form a cube in the device-independent color space and can represent a uniform sampling of the device-independent color space.

The color device can further be characterized by a source transform which converts colors from the device-dependent color space to the device-independent color space, and corner values can be added to the set of gamut boundary values before the polygonal surfaces are determined, the corner values corresponding to corners in the device-dependent color space which are converted to the device-independent color space using the source transform. The destination transform and the source transform can each correspond to tags within an ICC profile.

Sample values within the set of samples values which are in gamut and which are not likely to form a vertex of the gamut boundary description can be excluded from the set of gamut boundary values.

A color management module can also be provided which converts source color image data associated with a source color device to destination color image data associated with a destination color device using a gamut mapping algorithm, wherein the gamut mapping algorithm uses the determined gamut boundary description for at least one of the source color device and the destination color device.

According to another aspect of the invention, a gamut boundary description for a color device is determined, the color device being characterized at least by a destination transform and a source transform, where the destination transform converts colors from a device-independent color space to a device-dependent color space and converts out-of-gamut colors to valid colors in the device-dependent color space, and where the source transform converts colors from the device-dependent color space to the device-independent color space. A set of sample values is determined in the device-independent color space. For each of the sample values within the set of sample values, the sample value is converted to a value in the device-dependent color space using the destination transform, the value in the device-dependent color space is converted to a value in the device-independent color space using the source transform, and the value in the device-independent color space is included within a set of gamut boundary values. The gamut boundary description is determined by forming a set of polygonal surfaces based on the set of gamut boundary values.

The set of sample values can form a cube in the device-independent color space and can represent a uniform sampling of the device-independent color space.

Corner values can be added to the set of gamut boundary values before the polygonal surfaces are determined, the corner values corresponding to corners in the device-dependent color space which are converted to the device-independent color space using the source transform. The destination transform and the source transform can each correspond to tags within an ICC profile.

Sample values within the set of samples values which are not likely to form a vertex of the gamut boundary description can be excluded from the set of gamut boundary values. Values in the device-dependent color space which have already been processed are preferably not again converted to values in the device-independent color space for inclusion in the set of gamut boundary values.

A color management module can also be provided which converts source color image data associated with a source color device to destination color image data associated with a destination color device using a gamut mapping algorithm, wherein the gamut mapping algorithm uses the determined gamut boundary description for at least one of the source color device and the destination color device.

According to another aspect of the invention, a gamut boundary description is determined for a color device, the color device being characterized at least by a gamut-checking transform which determines whether colors in a device-independent color space are in gamut for the color device. A set of sample values is determined in the device-independent color space. For each of the sample values within the set of sample values, a determination is made as to whether the sample value is in gamut using the gamut-checking transform, and the sample value is included within a set of gamut boundary values, in a case where the sample value is in gamut. The gamut boundary description is determined by forming a set of polygonal surfaces based on the set of gamut boundary values.

The set of sample values can form a cube in the device-independent color space and can represent a uniform sampling of the device-independent color space.

The color device can be further characterized by a source transform which converts colors from the device-dependent color space to the device-independent color space, and wherein corner values can be added to the set of gamut boundary values before the polygonal surfaces are determined, the corner values corresponding to corners in the device-dependent color space which are converted to the device-independent color space using the source transform. The destination transform and the source transform can each correspond to tags within an ICC profile.

In addition, a color management module can be provided which converts source color image data associated with a source color device to destination color image data associated with a destination color device using a gamut mapping algorithm, wherein the gamut mapping algorithm uses the determined gamut boundary description for at least one of the source color device and the destination color device.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE INVENTION

Figure 1:
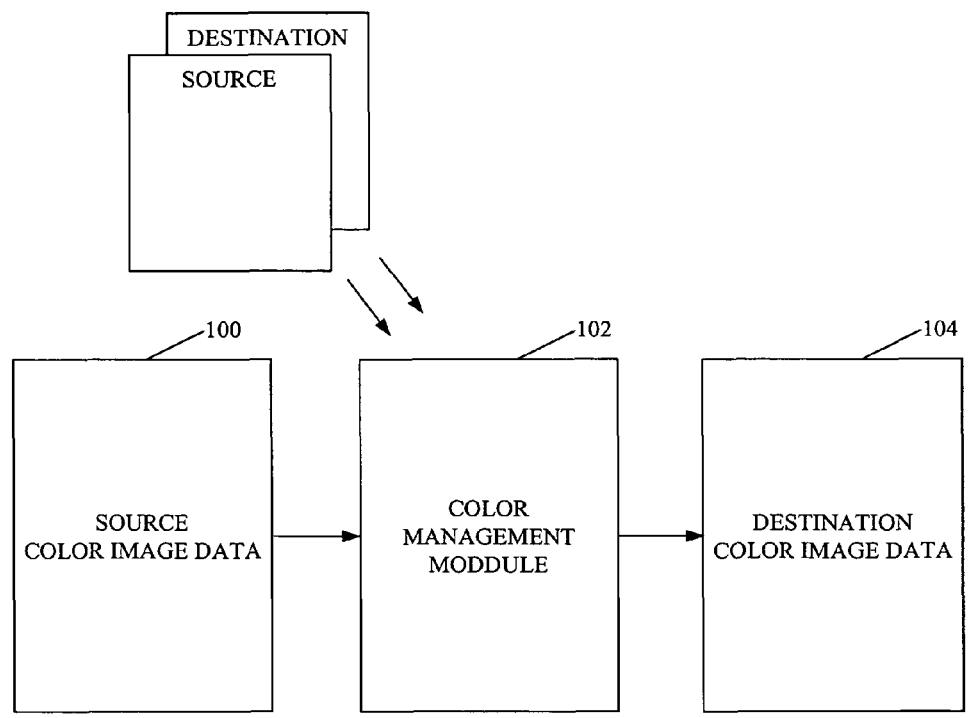
FIG. 1 is a diagram that provides a general explanation of a color management process using a gamut boundary description in accordance with a representative embodiment of the invention.

FIG. 1 is a diagram that provides a general explanation of a color management process using a gamut boundary description in accordance with a representative embodiment of the invention. As seen in FIG. 1, color management module 102 accesses two gamut boundary descriptions 106 corresponding to a source color device which generated source color image data 100, and to a destination color device which will produce corresponding destination color image data 104.

Color management module 102 converts colors between the source color device and the destination color device. In doing so, color management module 102 preferably uses a gamut mapping algorithm, which as noted above, is a particular method of mapping color data between gamuts of the two devices. The gamut mapping algorithm in turn uses the gamut boundary descriptions 106 which are determined as described later.

In other words, color management module 102 uses the gamut boundary descriptions 106 in gamut mapping, such that matrices and look-up tables are derived which properly map the colors of source color image data 100 into the desired areas of the gamut boundary of the destination color device, thereby generating destination color image data 104. Accordingly, the gamut boundary descriptions 106 of this representative embodiment are seen to achieve an improved and desirable reproduction of color image data.

Figure 2:
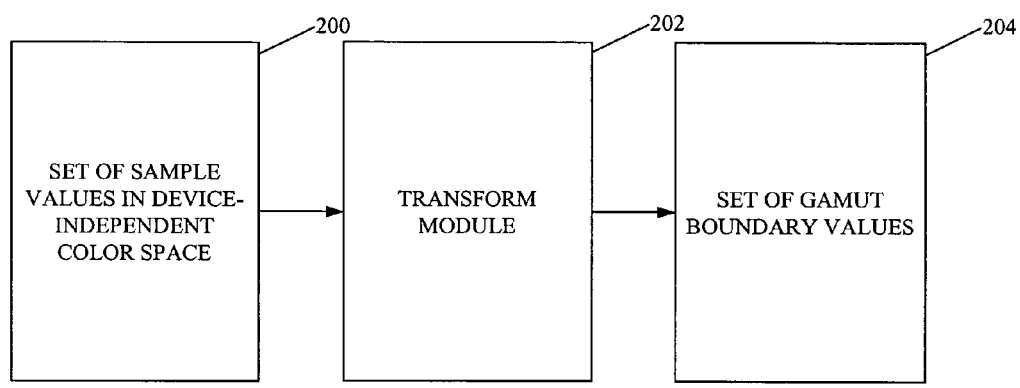
FIG. 2 is a diagram that provides a general explanation for determining a set of gamut boundary values, from which a gamut boundary description can be determined, in accordance with a representative embodiment of the invention.

FIG. 2 provides a general explanation for determining a set of gamut boundary values, from which a gamut boundary description can be determined, in accordance with a representative embodiment of the invention. A set of sample values in device-independent color space 200 is used by a transform module 202 to obtain a set of gamut boundary values 204. In obtaining the set of gamut boundary values, the transform module 202 applies at least one transform which characterizes a particular color device.

In this regard, different transforms can be used to characterize a color device. For example, a color device can be characterized at least by a destination transform which converts colors from a device-independent color space to a device-dependent color space, and which reports out-of-gamut colors. A color device can also be characterized at least by a destination transform and a source transform, where the destination transform converts colors from a device-independent color space to a device-dependent color space and converts out-of-gamut colors to valid colors in the device-dependent color space, and where the source transform converts colors from the device-dependent color space to the device-independent color space. In addition, the color device can be characterized at least by a gamut-checking transform which determines whether colors in a device-independent color space are in gamut for the color device.

Figure 3:
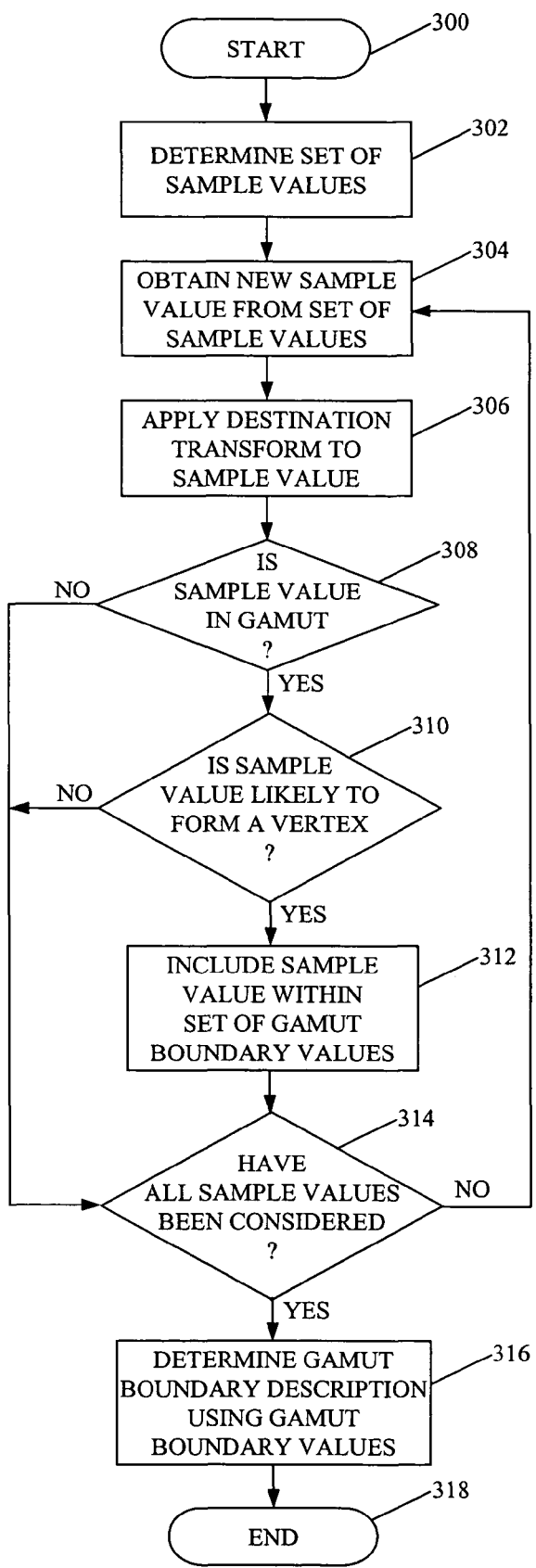
FIG. 3 is a flowchart depicting the determination of a gamut boundary description for a color device characterized at least by a destination transform which reports out-of gamut colors, in accordance with a representative embodiment of the invention.
Figure 4:
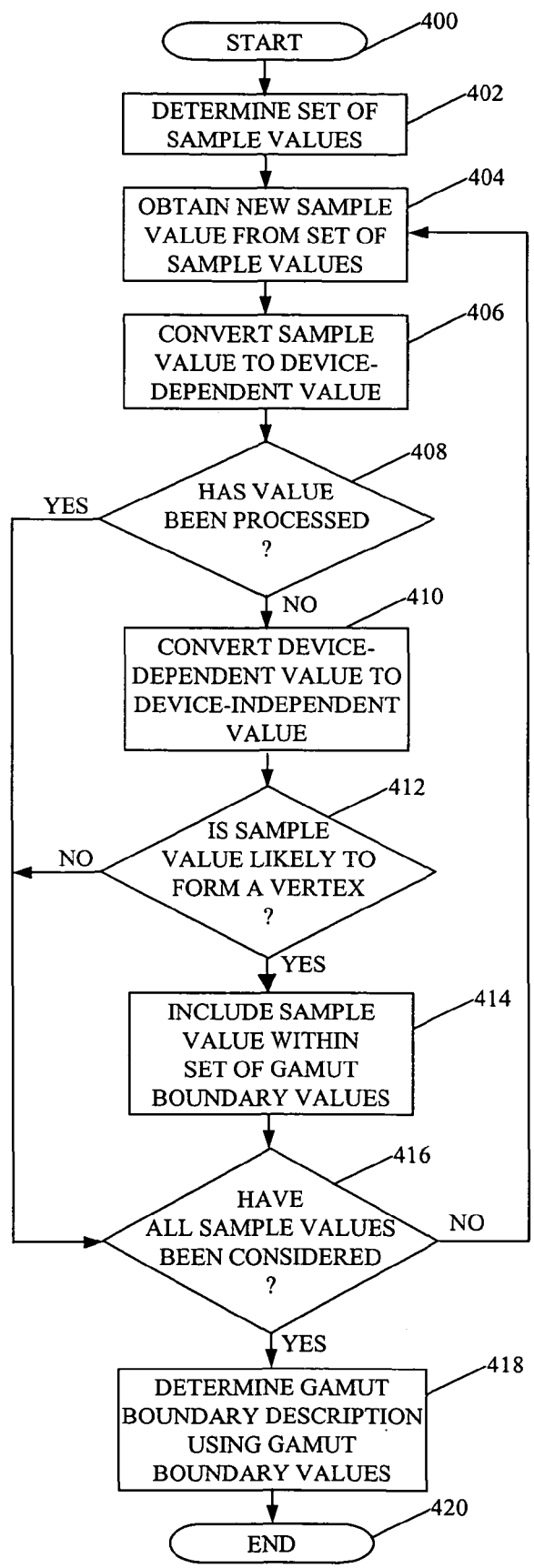
FIG. 4 is a flowchart depicting the determination of a gamut boundary description for a color device characterized at least by a destination transform and a source transform, where the destination transform converts out-of-gamut colors to valid device-dependent color values, in accordance with a representative embodiment of the invention.
Figure 5:
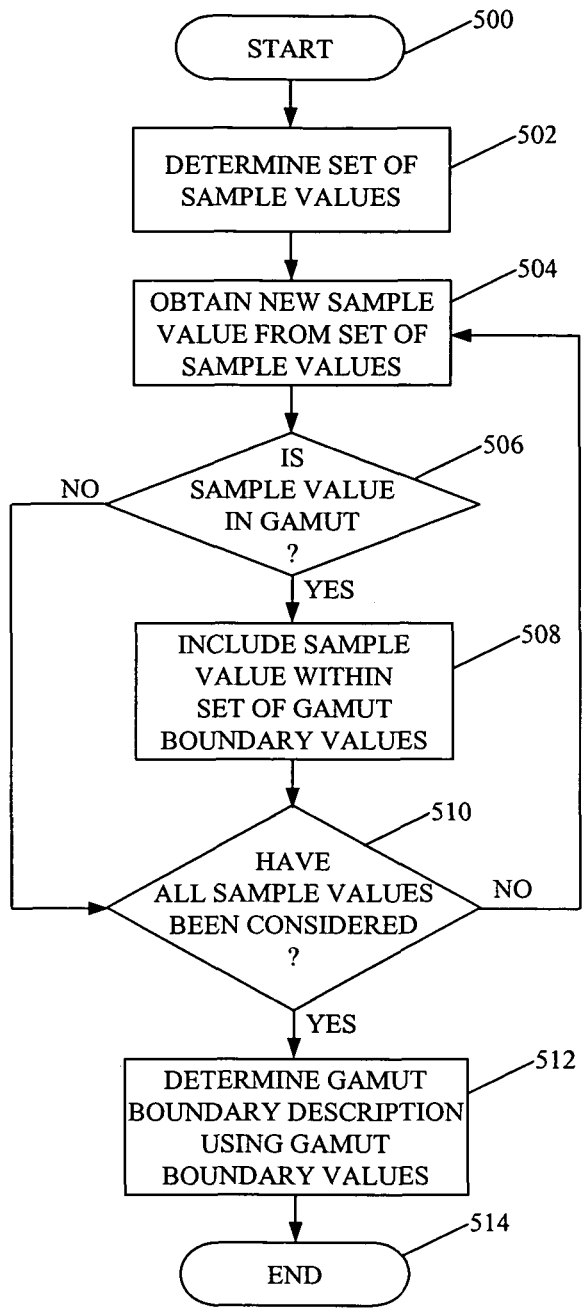
FIG. 5 is a flowchart depicting the determination of a gamut boundary description for a color device characterized at least by a gamut-checking transform, in accordance with a representative embodiment of the invention.

In FIGS. 3 to 5, different flowcharts are shown which correspond to different representative embodiments of the invention. These flowcharts depict the determination of a gamut boundary description for a color device which is characterized at least by one of the foregoing transforms.

FIG. 3 is a flowchart depicting the determination of a gamut boundary description for a color device characterized at least by a destination transform which reports out-of gamut colors, in accordance with a representative embodiment of the invention. Briefly, according to FIG. 3, a set of sample values is determined in the device-independent color space. For each of the sample values within the set of sample values, the destination transform is applied to the sample value, and in a case where the sample value is in gamut, the sample value is included within a set of gamut boundary values. The gamut boundary description is determined by forming a set of polygonal surfaces based on the set of gamut boundary values.

Following start bubble 300, a set of sample values is determined in device-independent color space (block 302). The set of sample values corresponds to reference 200 of FIG. 2. In this embodiment, the device-independent color space is preferably CIE L*a*b* (hereinafter "Lab"), which is defined at least in CIE document 15.3 Colorimetry, Third Edition, 2004. The set of sample values is preferably sampled uniformly to form a cube in Lab. In addition, the step size is preferably 17 (e.g., 17 steps per channel in each of the L, a, b channels). However, the step size can be varied arbitrarily to increase the fineness of the sampling.

In this regard, it should be noted that when using a convex hull representation of the gamut boundary description, there is typically a limit to the improvement in the accuracy of the gamut boundary description. As long as the sampling includes the extrema in the device-independent color appearance space, there is typically no benefit in accuracy by increasing the sample size. In addition, there is typically a performance cost associated with testing more points. Accordingly, 17 has been determined to be an appropriate sampling step size.

In addition to variance in step size, it should also be noted that device-independent color spaces other than Lab can be employed. In particular, any reasonably uniform color appearance space may be used for the device-independent color space. The Lab space is particularly appropriate if the color transforms (destination and/or source transforms) are provided by ICC profiles, because the ICC profile connection space is Lab. However, other device-independent color spaces, such as CIE $J_Ca_Cb_C$, can be used.

Finally, although it is preferred that the set of sample values be uniformly sampled within the device-independent color space, the sampling need not be uniform.

After the set of sample values is determined, a first sample value is obtained from the set of sample values (block 304), and the destination transform is applied to the obtained sample value (block 306). In applying the destination transform, if the sample value is in gamut, the sample value is converted to a value in device-dependent color space. Otherwise, the sample value is reported as out-of gamut.

Following application of the destination transform, a decision is made as to whether the sample value is in gamut (decision diamond 308). If the sample value is not in gamut, a new sample value is obtained in block 304, provided that all sample values have not yet been considered (decision diamond 314).

In one embodiment of the invention, if the sample value is in gamut, the sample value is automatically included within a set of gamut boundary values (block 312, skipping decision diamond 310).

In another embodiment of the invention, an additional determination is made as to whether the in-gamut sample value is likely to form a vertex of the gamut boundary (decision diamond 310), before the set of gamut boundary values is updated (block 312). If the sample value is not likely to form a vertex of the gamut boundary, a new sample value is obtained in block 304, provided that all sample values have not yet been considered (decision diamond 314).

With reference to the additional inquiry at decision diamond 310, it should be noted that different device-independent values that are inside the gamut of a color device will typically map to different device-dependent values. Thus, by recognizing the relationship between the sample values in device-independent color space, those sample values which are likely to be inside the gamut boundary can be determined. This allows for only sample values that are close to an edge (or vertex) of the gamut boundary to be included in the set of gamut boundary values, thereby reducing the number of gamut boundary values from which the gamut boundary description is determined.

In the device-independent color space of Lab, for each layer (in L), edges (or vertices) can be determined as follows. For each row in a current layer, the first pair of device colorants that is different is located, converted to Lab using the source transform, and added to the set of gamut boundary values (block 312). In the same row, the last pair of device colorants that is different is located, converted to Lab using the source transform, and added to the set of gamut boundary values (block 312). This is performed for each row of the current layer, and for each layer of L in the cube.

Once all of the sample values within the set of sample values have been considered (decision diamond 314), the gamut boundary description is determined based on the set of gamut boundary values (block 316), such as by forming a set of polygonal surfaces based on the set of gamut boundary values. The process thereafter ends (end bubble 318).

It should be noted that since the sampling occurs in the device-independent color space, it may be difficult to determine where a pure color (such as red) lies. As such, corner values can be added to the set of gamut boundary values before the gamut boundary description is determined. The corner values correspond to corners in the device-dependent color space which are converted to the device-independent color space using the source transform.

In addition, and as noted above, one convenient representation of the gamut boundary description is a set of convex, planar polygons. This set of bounding polygons can be obtained by computing the convex hull of the set of gamut boundary values. Although there are other ways to determine the bounding set of polygons given a set gamut boundary values, the convex hull is the preferred representation.

FIG. 4 is a flowchart depicting the determination of a gamut boundary description for a color device characterized at least by a destination transform and a source transform, where the destination transform converts out-of-gamut colors to valid device-dependent color values, in accordance with a representative embodiment of the invention. Briefly, according to FIG. 4, a set of sample values is determined in the device-independent color space. For each of the sample values within the set of sample values, the sample value is converted to a value in the device-dependent color space using the destination transform, the value in the device-dependent color space is converted to a value in the device-independent color space using the source transform, and the value in the device-independent color space is included within a set of gamut boundary values. The gamut boundary description is determined by forming a set of polygonal surfaces based on the set of gamut boundary values.

Following start bubble 400, a set of sample values is determined in device-independent color space (block 402). The device-independent color space is preferably Lab, and the set of sample values is preferably sampled uniformly to form a cube in Lab. In addition, the step size is preferably 17 (e.g., 17 steps per channel in each of the L, a, b channels). As noted above, other device-independent color spaces and step sizes can be employed, and the sampling does not necessarily have to be uniform.

After the set of sample values is determined, a first sample value is obtained from the set of sample values (block 404). The sample value is then converted to a value in device-dependent color space using the destination transform (block 406).

In one embodiment of the invention, the value in device-dependent color space is automatically converted to a value in device-independent color space using the source transform (block 410, skipping decision diamond 408), and the value in device-dependent color space is automatically included within a set of gamut boundary values (block 414, skipping decision diamond 412). By converting back to a device-independent value, a more accurate sampling of the gamut boundary of the color device can be obtained.

In another embodiment of the invention, a determination is made after the sample value is converted to a device-dependent value, as to whether the value in device-dependent color space has already been processed (decision diamond 408). This additional determination provides for converting the device-dependent value to device-independent color space only if the device-dependent value has not yet been converted, thereby reducing duplicate conversions. If the device-dependent value has already been processed, a new sample value is obtained in block 404, provided that all sample values have not yet been considered (decision diamond 416).

An example of determining whether a value in device-dependent color space has already been processed will now be discussed with reference to a range of light blue colors. If the range of light blue colors is presented to the destination transform, it might be expected that light blue colors which cannot be represented by the color device are all transformed to the same device-dependent value, which represents the lightest blue that the color device can produce. As such, once a device-dependent color value has been converted to a device-independent color value, the device-dependent value does not necessarily have to be converted again.

In yet another embodiment of the invention, a determination is made after the device-dependent value is converted to a device-independent value, as to whether the device-independent value is likely to form a vertex of the gamut boundary. As noted above, values in device-independent color space which are likely to be inside the gamut (and therefore unlikely to form an edge or vertex of the gamut boundary), do not necessarily have to be included in the set of gamut boundary values. If Lab is used as the device-independent color space, certain device-dependent values can be disregarded by applying the source transform only to device-dependent values at which differences are detected on a row-by-row basis for each layer in the L dimension. If the device-dependent value is not likely to form an edge or vertex of the gamut boundary, a new sample value is obtained in block 404, provided that all sample values have not yet been considered (decision diamond 416).

Once all the sample values within the set of sample values have been considered (decision diamond 416), the gamut boundary is determined based on the set of gamut boundary values (block 418) and the process ends (end bubble 420). As noted above, corner values can be added to the set of gamut boundary values before the gamut boundary description is determined. In addition, the convex hull of the set of gamut boundary values is the preferred representation of the gamut boundary description, although other representations can be employed.

FIG. 5 is a flowchart depicting the determination of a gamut boundary description for a color device characterized at least by a gamut-checking transform, in accordance with a representative embodiment of the invention. As noted above, a gamut-checking transform determines whether a value in device-independent color space is in gamut for a color device. This is different than the processing performed by source and destination transforms, which convert values between device-dependent and device-independent color spaces. Briefly, according to FIG. 5, a set of sample values is determined in the device-independent color space. For each of the sample values within the set of sample values, a determination is made as to whether the sample value is in gamut using the gamut-checking transform, and in a case where the sample value is in gamut, the sample value is included within a set of gamut boundary values. The gamut boundary description is determined by forming a set of polygonal surfaces based on the set of gamut boundary values.

Following start bubble 500 in FIG. 5, a set of sample values is determined in device-independent color space (block 502). The device-independent color space is preferably Lab, and the set of sample values is preferably sampled uniformly to form a cube in Lab. In addition, the step size is preferably 17 (e.g., 17 steps per channel in each of the L, a, b channels). As noted above, other device-independent color spaces and step sizes can be employed, and the sampling does not necessarily have to be uniform.

After the set of sample values is determined, a first sample value is obtained from the set of sample values (block 504). The gamut-checking transform is then applied to the sample value, in order to determine if the sample value is in gamut (decision diamond 506).

If the sample value is in gamut, the sample value is included in a set of gamut boundary values (block 508).

Otherwise, a new sample value is obtained in block 504, provided that all sample values have not yet been considered (decision diamond 510).

Once all the sample values within the set of sample values have been considered, the gamut boundary is determined based on the set of gamut boundary values (block 512), and the process ends (end bubble 514). As noted above, corner values can be added to the set of gamut boundary values before the gamut boundary description is determined. In addition, the convex hull of the set of gamut boundary values is the preferred representation of the gamut boundary description, although other representations can be employed.

As such, the foregoing embodiments of the present invention are seen to reduce the dimensionality of the search space when compared with conventional approaches. As noted above, if a search is performed in the device-dependent color space, the dimensionality of the search space typically increases exponentially with the number of colorants associated with the device-dependent color space. However, by searching in the device-independent color space, the dimensionality of the search is limited to the number of dimensions in the device-independent color space, which is typically three.

In addition, the foregoing embodiments of the present invention are seen to work well in a case where a set of sample values is not available from an external source. In a measurement based color management system, the actual measurements presented to the system represent a sample set of gamut boundary values, and these actual measurements can be used to define the gamut boundary description. However, in a case where a transform-based color profile (e.g., an ICC profile) is used in the system, no corresponding set of sample values is available. The foregoing embodiments of the present invention are seen to be useful at least in this situation.

Figure 6:
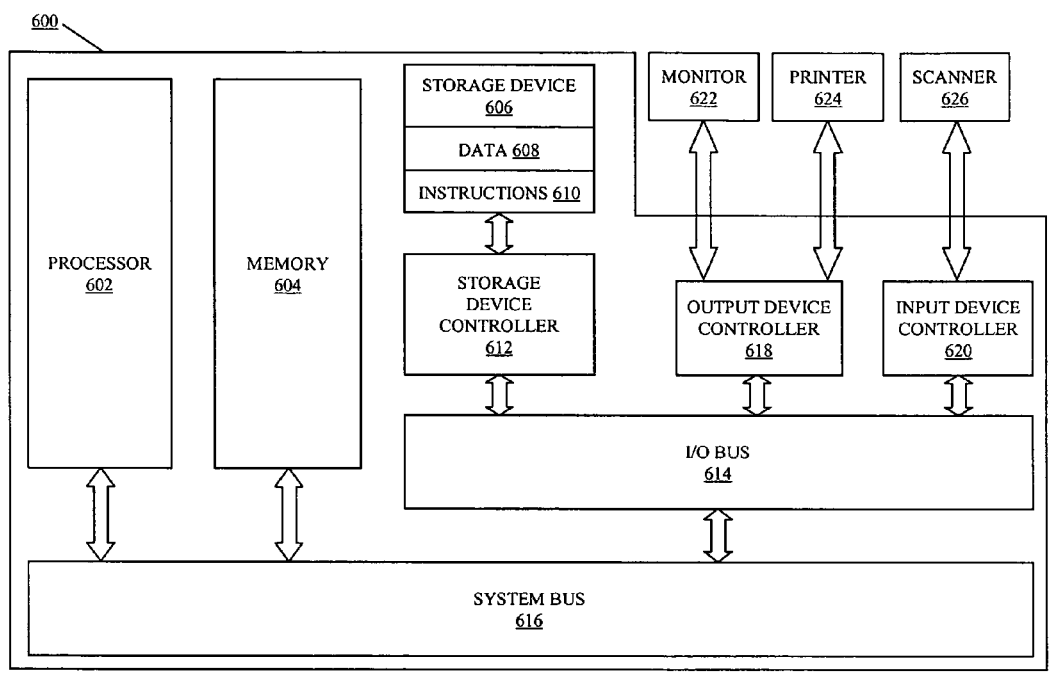
FIG. 6 is an architecture diagram for a data processing apparatus, such as a general purpose computing machine, suitable for hosting a process for generating a gamut boundary description in accordance with a representative embodiment of the present invention.

FIG. 6 is an architecture diagram for a data processing system, such as a general purpose computing machine, suitable for hosting a process for determining a gamut boundary description in accordance with a representative embodiment of the present invention. The data processing system 600 includes a processor 602 coupled to a memory 604 via system bus 616. The processor 602 is also coupled to external Input/Output (I/O) devices via the system bus 616 and an I/O bus 614. A storage device 606 having computer system readable media is coupled to the processor 602 via a storage device controller 612, the I/O bus 614 and the system bus 616. The storage device 606 is used by the processor 602 to store and read data 608 and program instructions 610 used to implement determination of a gamut boundary description as described above. The processor 602 may be further coupled to color output devices, such as computer display 622 and color printer 624, via an output device controller 618 coupled to the I/O bus 614. The processor 602 may also be coupled to a color input device 626, such as color scanner, via an input device controller 620.

In operation, the processor 602 loads the program instructions from the storage device 606 into memory 604. The processor 602 then executes the loaded program instructions 610 to determine a gamut boundary description. The result can be used, for example, by the printer 624, as described above.

The invention has been described above with respect to particular illustrative embodiments. It is understood that the invention is not limited to the above-described embodiments and that various changes and modifications may be made by those skilled in the relevant art without departing from the spirit and scope of the invention.

What is claimed is:

1. A method for determining a gamut boundary description for a color device, the color device being characterized at least by a destination transform which converts colors from a device-independent color space to a device-dependent color space and which reports out-of-gamut colors, the method comprising:

using a processor to perform the steps of:
determining a set of arbitrary sample values in accordance with an arbitrarily varied step size in the device-independent color space;
for each of the sample values within the determined set of sample values,
converting the sample value in the device-independent color space to another value in the device-dependent color space by using the destination transform and reporting the sample value as out of a gamut of the color device in a case where the sample value in the device-independent color space is not converted into another value in the device-dependent color space;
including the sample value within a set of gamut boundary values, in a case where the sample value is not reported as being out of the gamut of the color device; and
refraining from including the sample value within the set of gamut boundary values, in a case where the sample value is reported as being out of the gamut of the color device; and
determining the gamut boundary description by forming a set of polygonal surfaces based on the set of gamut boundary values.

2. A method according to claim 1, wherein the set of arbitrary sample values includes values which are chosen arbitrarily to increase fineness of sampling in a cube in the device-independent color space.

3. A method according to claim 1, wherein the color device is further characterized by a source transform which converts colors from the device-dependent color space to the device-independent color space, and wherein corner values are added to the set of gamut boundary values before the polygonal surfaces are determined, the corner values corresponding to corners in the device-dependent color space which are converted to the device-independent color space using the source transform.

4. A method according to claim 1, further comprising determining whether or not the sample value, which has not been reported as being out of the gamut, is likely to form a vertex of gamut boundary of the color device,
wherein the including step adds the sample value within the set of gamut boundary values in a case where the same value has been determined to be likely to form the vertex of the gamut boundary of the color device.

5. A color management unit constructed to convert source color image data associated with a source color device to destination color image data associated with a destination color device using a gamut mapping algorithm, by using a processor,
wherein the gamut mapping algorithm uses a gamut boundary description for the destination color device,
and wherein the gamut mapping description is determined by a method according to claim 1.

6. A non-transitory computer-readable storage medium retrievably storing computer-executable process steps, wherein the computer-executable process steps are for determining a gamut boundary description for a color device, the color device being characterized at least by a destination transform which converts colors from a device-independent color space to a device-dependent color space and which reports out-of-gamut colors, said computer-executable process steps comprising process steps executable to perform a method according to claim 1.

7. An apparatus for determining a gamut boundary description for a color device, the color device being characterized at least by a destination transform which converts colors from a device-independent color space to a device-dependent color space and which reports out-of-gamut colors, the apparatus comprising:
- a program memory for storing process steps executable to perform a method according to claim 1; and
- a processor for executing the process steps stored in said program memory.

* * * * *